United States Patent
Pandit

(10) Patent No.: US 6,757,260 B2
(45) Date of Patent: Jun. 29, 2004

(54) ANCILLARY INFORMATION TRANSMISSION WHILE USER IS ON HOLD DURING A TELECOMMUNICATIONS DEVICE TELECONFERENCE

(75) Inventor: Purvin Bibhas Pandit, Somerset, NJ (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/177,592

(22) Filed: Jun. 20, 2002

(65) Prior Publication Data

US 2003/0235218 A1 Dec. 25, 2003

(51) Int. Cl.[7] .......................... H04M 11/00; H04M 1/00; H04Q 11/00
(52) U.S. Cl. .................... 370/260; 379/93.21; 379/158; 379/205.01; 348/14.01; 348/14.09
(58) Field of Search ................................ 370/235, 260, 370/263, 522; 379/56.2, 93.19, 93.21, 100.17, 158, 202.01, 205.01, 908; 348/14.01, 14.03, 14.09; 455/452; 358/434

(56) References Cited

U.S. PATENT DOCUMENTS

| | | | |
|---|---|---|---|
| 5,875,231 A | * | 2/1999 | Farfan et al. ............... 379/67.1 |
| 5,990,933 A | * | 11/1999 | Ozone et al. ............ 348/14.09 |
| 6,141,328 A | | 10/2000 | Nabkel et al. ............... 370/259 |
| 6,219,415 B1 | * | 4/2001 | Deutsch et al. ......... 379/215.01 |
| 2001/0040621 A1 | * | 11/2001 | Gerszberg et al. ........ 379/93.12 |

* cited by examiner

Primary Examiner—Chi Pham
Assistant Examiner—Afsar M. Qureshi
(74) Attorney, Agent, or Firm—Joseph S. Tripoli; Ronald H. Kurdyla; Joel M. Fogelson

(57) ABSTRACT

There is provided a method for providing ancillary information to a user of a telecommunications device. The ancillary information is received during a time period when the user of the telecommunications device is in a hold operating mode during a telecommunications device voice based teleconference. The ancillary information is at least one of audibly and visually reproduced for the user, wherein the category of ancillary information is preselected by the user.

18 Claims, 3 Drawing Sheets

ANCILLARY INFORMATION TRANSMISSION WHILE USER IS ON HOLD DURING A TELECOMMUNICATIONS DEVICE TELECONFERENCE

BACKGROUND OF THE INVENTION

1. Field of the Invention

The present invention generally relates to telecommunications devices and, more particularly, to a method and apparatus for providing ancillary information to a user of a telecommunications device while the user is on hold during a voice teleconference.

2. Background of the Invention

In a typical voice based teleconference, such as a telephone call or a voice conference, one party may put one or more other parties, each using a telecommunications device, on hold. For example, a party to a telephone call may be placed on hold because a second party receives an incoming telephone call (e.g., call waiting) or for some other reason. This results in a period of silence during which no information is sent or received by the party on hold. This period of silence can often be long and results in wasted time for the party that has been placed on hold.

Accordingly, it would be desirable and advantageous to have a method and apparatus for providing ancillary information to a user of a telecommunications device while the user is on hold during a voice teleconference.

SUMMARY OF THE INVENTION

A method and apparatus for providing ancillary information to a user of a telecommunications device while the user is on hold during a voice teleconference.

DETAILED DESCRIPTION OF THE INVENTION

Figure 1:
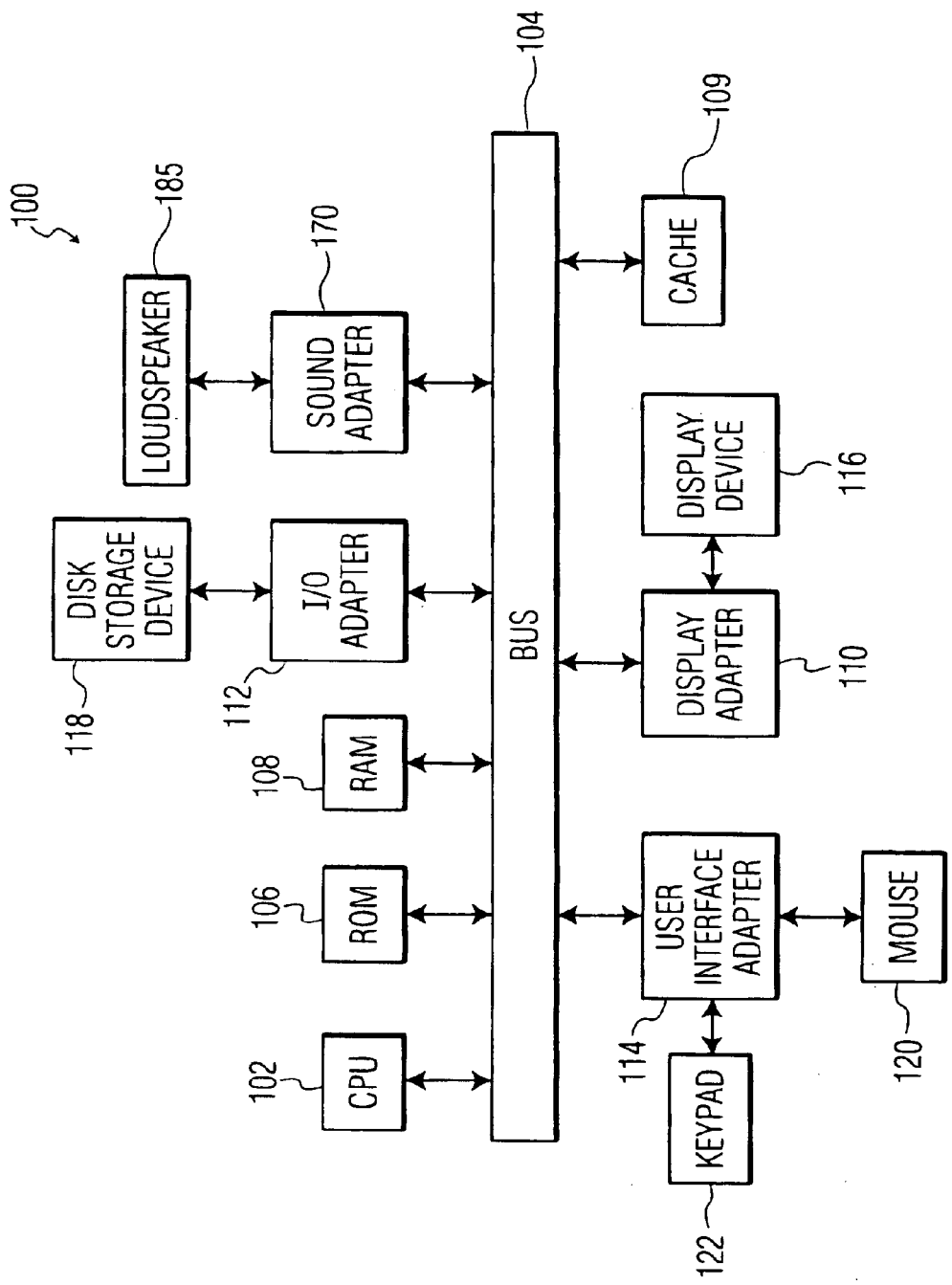
FIG. 1 is a block diagram of a computer processing system 100.

The present invention is directed to a method and apparatus for providing ancillary information to a user of a telecommunications device while the user is on hold during a voice teleconference. For illustrative purposes, the present invention is described in respect to mobile telecommunications devices. However, it is to be appreciated that the present invention may be employed with any type of telecommunications device including, but not limited to, hardwired telecommunications devices, telephones, voice enable personal desk assistants (PDA), telecommunication devices utilizing Voice over Internet Protocol (VoIP) voice telephony. Moreover, while the present invention is described herein with respect to mobile communications involving one or more mobile telecommunications devices, mobile communication systems, and mobile service providers, it is to be further appreciated that the present invention is also applicable to other types of communications, telecommunications devices, communication systems, and service providers, while maintaining the spirit and scope of the present invention. For example, the present invention may be employed in a wired communication environment (e.g., public switched telecommunications device network (PSTN)), a packet switched telecommunications device network, a mobile communication environment (e.g., a cellular phone, a cellular phone integrated with a personal desk assistant, WI FI enabled telecommunications device, 3G enabled telecommunications environment, BLUETOOTH™ enabled telecommunications device, etc., or any combination thereof). Given the teachings of the present invention provided herein, one of ordinary skill in the related art will contemplate these and various other communications, telecommunications devices, communication systems, and service providers to which the present invention may be applied, while maintaining the spirit and scope of the present invention.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device. The platform may also be connected to a communications network (e.g., a Local Area Network, Internet) with the capability to transmit and receive communications packets that are communicated to other connected telecommunications devices.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention. According to an aspect of the present invention, there is provided a method for providing ancillary information to a user of a telecommunications device. The ancillary information is received during a time period when the user of the telecommunications device is on hold during a telecommunications device voice teleconference. The ancillary information is at least one of audibly and visually reproduced for the user.

As for the described embodiments of the invention, according to one described aspect of the present invention, there is provided a method for providing ancillary information to a user of a telecommunications device. A time period is detected when the telecommunications device of the user is on hold. The ancillary information is transmitted to the telecommunications device of the user during the time period.

According to yet another aspect of the present invention, there is provided an apparatus for a telecommunications device. A receiver, of the telecommunications device, receives ancillary information when the telecommunications device is in a detected hold mode. At least one loudspeaker audibly reproduces the ancillary information and/or a display that visually reproduces the ancillary information.

According to another aspect of the present invention, there is provided an apparatus for providing ancillary information to a telecommunications device. The telecommunications device has at least one loudspeaker for audibly reproducing the ancillary information and/or a display for visually reproducing the ancillary information. The apparatus comprises a receiver for receiving a user input that specifies a category of ancillary information for transmission, and a transmitter for transmitting the ancillary information to the telecommunications device when the telecommunications device is in a hold mode.

These and other aspects, features and advantages of the present invention will become apparent from the following detailed description of preferred embodiments, which is to be read in connection with the accompanying drawings.

FIG. 1 is a block diagram of a computer processing system 100 to which the present invention may be applied. The computer processing system 100, representing an example of a communication device, such as a telephone, voice conferencing system, a VoIP enabled device, remote communicator, and the like, includes at least one processor (CPU) 102 operatively coupled to other components via a system bus 104. A read only memory (ROM) 106, a random access memory (RAM) 108, a cache 109, a display adapter 110, an I/O adapter 112, a user interface adapter 114, and a sound adapter 170 are operatively coupled to the system bus 104.

A display device 116 is operatively coupled to the system bus 104 by the display adapter 110. A storage device 118 (e.g., a magnetic or optical disk storage device, flash memory, smartcard, memory stick, etc.) operatively couples to the system bus 104 by the I/O adapter 112.

Selection device 120 (e.g., mouse, joystick, joypad, scroll dial, etc.) and keypad 122 operatively couple to system bus 104 by user interface adapter 114. The selection device 120 and keyboard 122 may be used to input/output information to/from the computer processing system 100.

Sound adapter 170 operatively couples at least one loudspeaker 185 to system bus 104.

One of the ordinary skill in the art will appreciate a telecommunications device may be implemented in various modifications of the system represented in FIG. 1, including or excluding the displayed elements.

Figure 2:
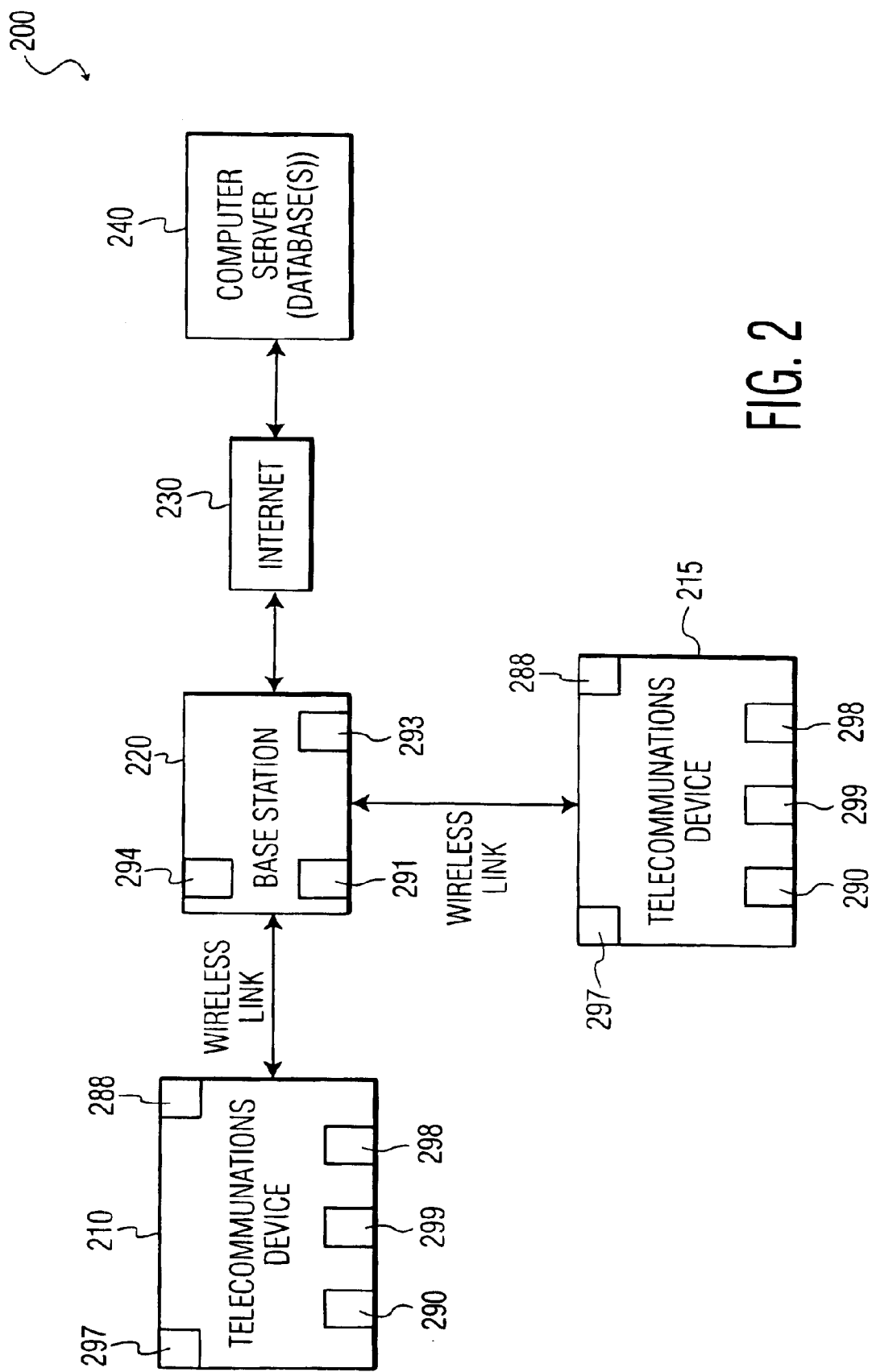
FIG. 2 is a block diagram illustrating a communication system 200.

FIG. 2 is a block diagram illustrating a communication system 200 to which the present invention may be applied.

It is to be appreciated that many of the elements of the communication system 200 will have a computer processing system integrated therewith. Such a computer processing system is preferably the same or similar to (having one or more of the same or similar elements) that shown in FIG. 1. However, other variations of a computer processing system may be readily employed by one of ordinary skill in the related art, while maintaining the spirit and scope of the present invention.

The communication system 200 includes a communication path(s) formed by the following: a telecommunications device of a user 210 (hereinafter also referred to as "user telecommunications device"); another telecommunications device of another user 215, a base station 220; Internet 230; and a computer server 240. The computer server 240 includes one or more databases. It is to be appreciated that while one computer server is shown in FIG. 2 as to simplify the figure and accompanying description, one of ordinary skill in the related art will realize that the Internet couples to more than one computer server, communication device, and related devices. Alternatively, the connection between more than one computer servers may comprise at least one of a local area network, Ethernet based network, point-to-point connection, hardwire network, wide area network, and a wireless area network (local, wide). The telecommunications devices 210 and 215 each include a receiver 290 for at least receiving ancillary information, at least one loudspeaker 299 for audibly reproducing ancillary information, a display 298 for visually reproducing ancillary information, an input module 297 for receiving at least one user input, and a transmitter 288 for transmitting at least one user input. The base station 220 includes a detection device 291 for detecting that a user of a telecommunications device is on hold, a receiver 293 for receiving at least a user input that specifies a category of ancillary information and another user input that indicates that the user is on hold, and a transmitter 294 for transmitting the ancillary information when the user is detected as being on hold. Preferably, the communications between base station 220 and telecommunications devices 210 and 215 may be transmitted wirelessly as data signals with code segments (such as data packets) via a carrier wave, though the invention supports other embodiments consistent with hardwired, wireless, or other types of connections that facilitate communications between telecommunications devices.

In the illustrative embodiments herein, the ancillary information is automatically provided to the user when the user is on hold. Alternatively, the user may request that ancillary information be provided when the user is on hold (e.g., the user transmits an input to the service provider that indicates that the user is currently on hold; this feature may be turned on and off via communication with service provider through an input means such as input module 297). Given the teachings of the present invention provided herein, one of ordinary skill in the related art will contemplate these and various other implementations of the present invention while maintaining the spirit and scope of the present invention.

Figure 3:
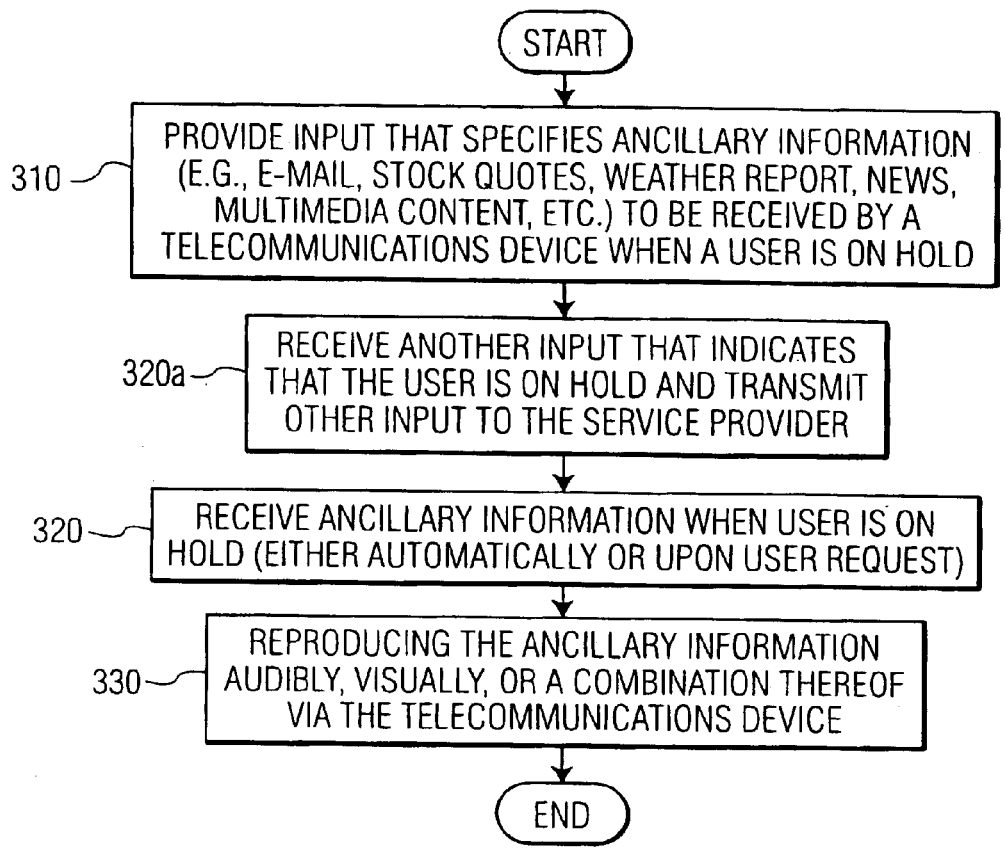
FIG. 3 is a flow diagram illustrating a method for providing a telecommunications device with ancillary information.

FIG. 3 is a flow diagram illustrating a method for providing a telecommunications device with ancillary information. The method of FIG. 3 describes the steps performed in respect to the telecommunications device. It is presumed that the telecommunications device has the capability to receive ancillary information (e.g., e-mail, a stock quote, weather report, sport score, news, and other information). One embodiment of the invention transfers ancillary information in a textual format (e.g., ASCII, HTML, XML, etc.) that is transmitted from a remote database 240 that receives information feeds from news sources such as Reuters, Associated Press, and United Press International. Optionally, the database 240 receives information from sources via Internet 230, through a network connection, such as news servers, web sites, E-mail POP servers, file transfer protocol sites, and other related sites that may be accessed via a Uniform Resource Indicator and/or Internet Protocol address. Also, the input specifies the category of ancillary information that is received by a user while on hold; examples of categories of ancillary information include examples as e-mail, news, movie trailers, commercial ads, baseball scores, basketball scores, streamed multimedia files, and related forms of information. The user may optionally elect to receive advertisements, from an ancillary information source, while on hold, in order to have a subsidy applied towards their telecommunications bill.

An input is provided (e.g., transmitted) that specifies the ancillary information that is to be received by the telecommunications device of the user when the user is placed on hold during a telecommunications device voice teleconference (step 310). The input may be provided via one or more menus that are readily accessible to the user, visually and/or audibly. According to the illustrative embodiment of FIG. 3, step 310 may be performed at any time, thereby allowing the user to change any previous selections (selected categories) of ancillary information. However, it is to be appreciated that while the method of FIG. 3 describes the ancillary information as being readily modified at any time, in other embodiments of the present invention the ancillary information selection may be provided to the service provider at the time the user "signs up" with the service provider or initially activates the ancillary information feature with the service provider. In such a case, the ancillary information may be provided by other means than through inputs received by the telecommunications device (e.g., in a form or other document, verbally, through e-mail, conventional mail, and so forth). Of course, the invention is not limited to the preceding ways to provide ancillary information. That is, given the teachings of the present invention provided herein, one of ordinary skill in the related art will contemplate these and various other ways in which a user may select ancillary information and categories of ancillary information that are to be received while the user is on hold during a telecommunications device voice teleconference, while maintaining the spirit and scope of the present invention. The transmission of ancillary information, for example, is received by telecommunications device 210 from base station 220 from a database source as 240.

When the user is placed on hold during a voice teleconference, the ancillary information is received by the telecommunications device of the user (step 320). The transmission of ancillary information, for example, is received by telecommunications device 210 from base station 220 from a database source 240. It is to be appreciated that the ancillary information may be received during the voice teleconference or upon user request. For example, step 320 may include the step of transmitting another input to a service provider that indicates that the user is currently on hold (step 320a). The other input amounts to a user request for the ancillary information to be transmitted.

The ancillary information is audibly reproduced and/or visually reproduced for the user (step 330). For example, the text information comprising the ancillary information is outputted in an audio form via a text to speech software program on at least one loudspeaker 299 Alternatively, the ancillary information may be outputted in the form of music from a multimedia file (e.g., an MP3, Real Audio™, or other streaming media formats) which either is stored in a telecommunications device (in for example RAM 108 or storage device 118) or is streamed to the communications device and outputted via loudspeaker 299 and/or displayed via display 298 of the telecommunications device. Ancillary information may also comprise multimedia that may be manipulated by a user while the user is on hold via input module 297. Examples of manipulated multimedia are a video game, a movie trailer, a Macromedia Flash cartoon, MPEG-4 movie, MPEG-2 media, a remote messaging mode as Short Messaging Service (SMS), etc. Advantageously, the present invention allows what would otherwise be idle time to be instead occupied by the provision of ancillary information.

Figure 4:
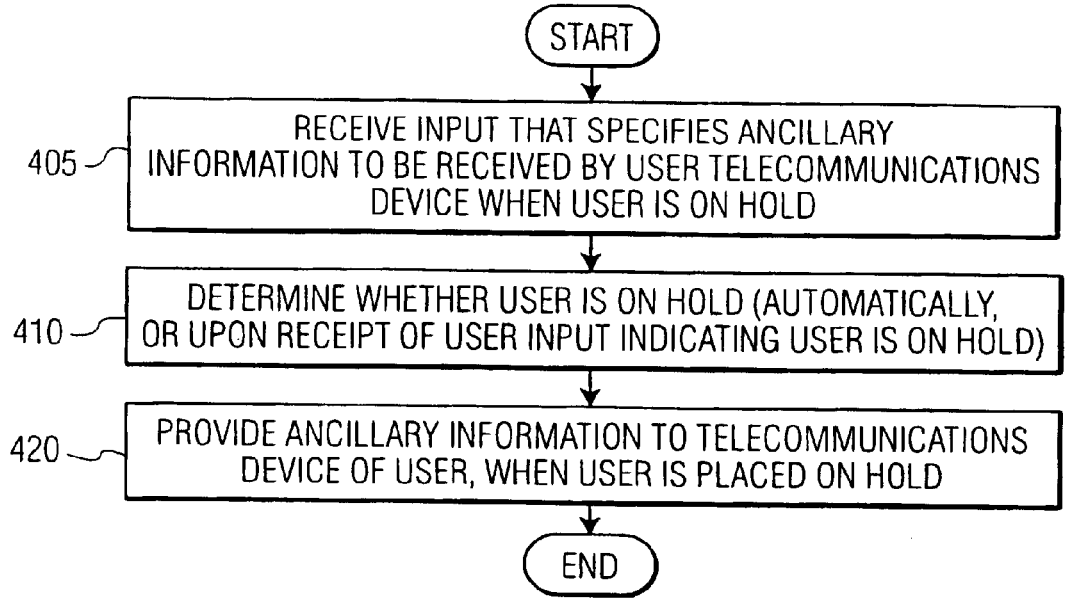
FIG. 4 is a flow diagram illustrating a method for providing a telecommunications device with ancillary information.

FIG. 4 is a flow diagram illustrating a method for providing a telecommunications device with ancillary information, according to another illustrative embodiment of the present invention. As noted above, the method of FIG. 4 describes the steps performed with respect to the service provider of the telecommunications device, in contrast to the method of FIG. 3 above, which describes the steps performed with respect to the telecommunications device.

User inputs are received from a user that specify the category of ancillary information to be provided to the telecommunications device of the user when the user is placed on hold during a telecommunications device voice teleconference (step 405). As noted above, step 405 may be performed using any methodology. Preferably, step 405 is performed using the telecommunications device of the user (e.g., through voice menus, Dual-Tone Multi Frequency (DTMF) tones, speech and/or speaker recognition, control signals, and so forth).

It is determined whether the user is on hold during a voice teleconference between the user and at least one other party (step 410). Step 410 may be performed automatically by the service provider via a service code (e.g., a PSTN service control code), upon receipt of an input from the user via his or her telecommunications device, or by a signal generated by the party putting the other party or parties on hold (e.g., a tone, a control code). Alternatively, the telecommunications device, itself, may determine that a user is on hold by sampling the audio signal (of the voice conference) and determining that an audio signal with a low amplitude for volume (below a predetermined threshold) for a preset period time represents that at user is on hold. The telecommunications device then may notify the service provider to transmit ancillary information, for the duration of a user being on hold. Similarly, the service provider may employ different levels of voltages (e.g., as utilized for other calling services), or use a multi-segmented code formatted data signal (e.g., a header of a data packet) to notify a telecommunications device that a user is on hold, in order for the device to receive ancillary information.

During the time period that the user is on hold, ancillary information is provided to the telecommunications device of the user (step 420).

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for processing ancillary information for use by a telecommunications device, comprising the steps of;

receiving the ancillary information, during a time period when the telecommunications device is in a hold operating mode; and reproducing the ancillary information on the telecommunications device, wherein the reproducing step is selected from a group comprising at least one of an audible reproduction and a visual reproduction, wherein a category of ancillary information to be received is selected by at least one of: a user input before being out in a hold operating mode, a user input when enabling an ancillary information service, and a user input while being put in the hold operating mode.

2. The method of claim 1, further comprising the steps of:
transmitting an input to a service provider to indicate that the telecommunications device is in the hold operating mode.

3. The method of clam 2, wherein said input is generated by at least one of: automatically by the telecommunications device, by a party placing the telecommunications device in the hold operating mode, and by a user using the telecommunications device.

4. The method of claim 1, wherein the ancillary information corresponds to at least one of e-mail, a stock quote, a weather report, a sport score, a movie trailer, a commercial ad, a MP3, a REALAUDIO™ file, a streaming media file, a messaging information, a SMS message, and manipulated multimedia.

5. The method of claim 1, wherein the telecommunications device is selected from a group comprising at least one of: a mobile telecommunications device, telephone, a hard-wired telecommunication device, a telecommunications device using VoIP based telephony, a voice activated personal desktop assistant.

6. The method of claim 1, wherein a user enables the reproducing of advertisements, while in the hold operating mode, for a communications based subsidy.

7. A method for providing ancillary information to a telecommunications device, comprising the steps of:
detecting a time period when the telecommunications device is in a hold operating mode, wherein said detecting step is performed automatically during a voice teleconference; and
transmitting the ancillary information to the telecommunications device during the time period.

8. The method of claim 7, wherein said detecting step comprises the step of receiving at least one input from the telecommunications device that indicates the telecommunications device is in the hold operating mode.

9. The method of claim 7, wherein the ancillary information corresponds to at least one of e-mail, a stock quote, a weather report, a sport score, a movie trailer, a commercial ad, a MP3, a REALAUDIO™ file, a streaming media file, a messaging information, a SMS message, and manipulated multimedia.

10. The method of claim 7, wherein the telecommunications device is selected from a group comprising at least one of: a mobile telecommunications device, telephone, a hard-wired telecommunication device, a telecommunications device using VoIP based telephony, a voice activated personal desktop assistant.

11. A method for providing ancillary information to a telecommunications device, comprising the steps of:
detecting a time period when the telecommunications device is in a hold operating mode and
transmitting the ancillary information to the telecommunications device during the time period
wherein a category of ancillary information is selected by at least one of: a user input before being put in a hold operating mode, a user input when enabling an ancillary information service, and a user input while being put in the hold operating mode.

12. An apparatus for a telecommunications device comprising:
a receiver for receiving ancillary information when the telecommunications device is in the hold operating mode; and
at least one of a device for audibly reproducing the ancillary information and a display for visually reproducing the ancillary information, wherein a category of ancillary information to be received is selected by at least one of: a user input before being put in a hold operating mode, a user input when enabling an ancillary information service, and a user input while being put in the hold operating mode.

13. The apparatus of claim 12, further comprising:
an input module for receiving at least one user input; and
a transmitter for transmitting the at least one user input to a service provider that indicates that the user is in the hold operating mode.

14. The apparatus of claim 12, wherein the category of ancillary information corresponds to at least one of e-mail, stock quotes, weather reports, sport scores, movie trailers, commercial ads, MP3s, REALAUDIO™ files, streaming media files, and manipulated multimedia.

15. The apparatus of claim 12, wherein the telecommunications device is selected from a group comprising at least one of: a mobile telecommunications device, telephone, a hard-wired telecommunication device, a telecommunications device using VoIP based telephony, a voice activated personal desktop assistant.

16. A data signal embodied in a carrier wave, wherein the data signal is functionally related to telecommunications systems such that the data signal is used for reproducing ancillary information when a telecommunications device is in a hold mode, comprising:
a code segment identifying the telecommunications device being in the hold operating mode;
a code segment identifying the ancillary information the telecommunications device will be able to process while in the hold operating mode; and
a code segment comprising information related to a category of ancillary information.

17. The data signal of claim 16, wherein the signal is generated by a device selected from a group comprising at least one of: a mobile telecommunications device, telephone, a hard-wired telecommunication device, a telecommunications device using VoIP based telephony, a voice activated personal desktop assistant, a device connected to a 3G enabled system, a device connected to a packet switched network, and a device connected to a circuit switched network.

18. The data signal of claim 16, wherein the content of ancillary information corresponds to at least one of e-mail, a stock quote, a weather report, a sport score, a movie trailer, a commercial ad, a MP3, a REALAUDIO™ file, a streaming media file, a messaging information, a SMS message, and manipulated multimedia.

* * * * *